United States Patent [19]

Hsu

[11] Patent Number: 4,517,215
[45] Date of Patent: May 14, 1985

[54] PREPARATION OF VEGETABLE PASTAS
[75] Inventor: Jau Y. Hsu, Brookfield, Conn.
[73] Assignee: Nestec, S.A., Vevey, Switzerland
[21] Appl. No.: 498,283
[22] Filed: May 26, 1983
[51] Int. Cl.$^3$ ............................................... A23L 1/16
[52] U.S. Cl. .................................... 426/557; 426/451
[58] Field of Search ................ 426/557, 451, 804, 575

[56] References Cited

U.S. PATENT DOCUMENTS

| 3,836,680 | 9/1974 | Salza | 426/557 |
| 3,992,554 | 11/1976 | Blake et al. | 426/557 |

FOREIGN PATENT DOCUMENTS

| 857276 | 12/1970 | Canada | 426/557 |
| 46-42927 | 12/1971 | Japan | 426/557 |
| 0615913 | 6/1978 | U.S.S.R. | 426/557 |

Primary Examiner—Raymond Jones
Assistant Examiner—Elizabeth A. King
Attorney, Agent, or Firm—Vogt & O'Donnell

[57] ABSTRACT

A process for the preparation of a vegetable pasta characterized in that a composition comprising a seed or tuberous vegetable in particulate form and, based on the total weight of the composition, from 0.1 to 4% by weight of sodium or potassium alginate or a mixture thereof, from 0.1 to 4% by weight of propylene glycol alginate and from 0 to 75% by weight of starch, is mixed with an amount of water sufficient to moisten the composition and render it extrudable, extruded into a pasta shape and finally dried, with proviso that at least 10% by weight of starch must be present when a high protein vegetable or potato powder is used.

6 Claims, No Drawings

PREPARATION OF VEGETABLE PASTAS

The present invention relates to a process for preparing vegetable pastas, particularly to pastas prepared from seed or tuberous vegetables as the basic ingredients, such as corn, potato, beans and peas.

Conventional vegetable pastas such as spinach and tomato pastas consist mainly of wheat flour as the basic ingredient with only about 3% of spinach or tomato solids being added. It is to be understood that in the vegetable pastas of this invention it is the seed or tuberous vegetables themselves in particulate form such as flours, powders, or granules that are used as the basic ingredients with no or substantially no wheat flours added. Pasta products with satisfactory cooking quality and texture cannot be prepared by conventional methods using such vegetables as the basic ingredients owing to the fact that the type and content of protein of these vegetables are different from that of semolina, durum flour, farina or regular wheat flour. For example, semolina and durum wheat contain from about 12–14% protein which is mostly gliadin and glutenin and which is believed to contribute to the pasta making quality while pea, bean and potato contain mostly globulin, and corn contains albumin and globulin. In addition, these vegetables can be classified into two groups, viz. low protein vegetables such as corn and potato containing from about 7–8% protein and high protein vegetables such as beans and peas containing from about 20–24% protein. Because of this difference in type and content of protein and also a different starch/protein ratio, the pasta-making quality of these vegetables is poor and they tend to break apart after cooking.

We have now found surprisingly that by adding a mixture of certain alginate gums or a mixture of certain alginate gums and starch to the seed or tuberous vegetables in particulate form, vegetable pastas with good cooking quality and texture similar to pastas prepared from semolina or durum wheat can be produced.

Accordingly, the present invention provides a process for the preparation of a vegetable pasta characterised in that a composition comprising a seed or tuberous vegetable in particulate form and, based on the total weight of the composition, from 0.1 to 4% by weight of sodium or potassium alginate or a mixture thereof, from 0.1 to 4% by weight or propylene glycol alginate and from 0 to 75% by weight of starch, is mixed with an amount of water sufficient to moisten the composition and render it extrudable, extruded into a pasta shape and finally dried, with the proviso that at least 10% by weight of starch must be present when a high protein vegetable or potato powder is used.

Examples of tuberous vegetables are potatoes and sweet potatoes and examples of seed vegetables are corn, peas, lentils and beans, e.g. mung beans, soy beans, kidney beans and pinto beans.

The vegetable may be in the form of the flour, powder or granule. The flour, which is preferred, is the unlocked material and the powder is the pre-cooked material. The granule is the larger particle of either the flour or powder.

The amount of sodium or potassium alginate or a mixture thereof is preferably from 0.25 to 3% by weight and especially from 0.5 to 2.5% by weight based on the total weight of the composition.

The amount of propylene glycol alginate is preferably from 0.25 to 3% by weight and especially from 0.5 to 2.5% by weight based on the total weight of the composition.

The amount of starch is preferably from 20 to 60% by weight and especially from 25 to 50% by weight based on the total weight of the composition when the vegetable used is a high protein vegetable or potato powder.

The starch is preferably derived from the vegetable used in the composition, but if desired it may be derived from another seed or tuberous vegetable, or it may be wheat or rice starch. Other ingredients which may optionally be added to the composition are:

(a) egg products such as egg white, whole egg or egg yolk either in powder or liquid form in amounts conveniently up to 15% by weight and preferably from 1 to 10% by weight based on the total weight of the composition.

(b) starch complexing agents, for example, glyceryl monostearate, in amounts conveniently up to 2.5% by weight based on the total weight of the composition.

(c) wheat gluten in amounts conveniently up to 20% by weight and preferably from 1 to 10% by weight based on the total weight of the composition.

The amount of water used to moisten the composition is conviently from 25 to 45% by weight, preferably from 27 to 40% by weight and especially from 28 to 35% by weight based on the total weight of the composition.

The pasta may be extruded into a variety of conventional shapes including all shapes of macaroni and noodle products which comprise all sizes of spaghetti, vermicelli, linguine, ziti, elbow spaghetti, orzo, shell, elbow macaroni, rigatoni, macaroni, twist rings, alphabets, lasagne, spirals, manicotti, noodles and bows.

After extrusion, but before the extruded pasta is dried, the process of the invention may comprise a pre-cooking step which may be carried out by either water boiling or by steam cooling. By carrying out such a pre-cooking step, the process of the invention may be used to prepare instant vegetable pasta products.

The extruded pastas may be dried by conventional methods, for example, at a temperature from 45° to 55° C. and at a relative humidity from 75 to 90% for a period of from 2 to 8 hours. The moisture content of the dried pastas is generally from about 8 to 13%.

The present invention also provides a pasta composition comprising a seed or tuberous vegetable in particulate form and, based on the total weight of the composition, from 0.1 to 4% by weight of sodium or potassium alginate or a mixture thereof, from 0.1 to 4% by weight of propylene glycol and from 0 to 75% of starch.

The preferred proportions of the ingredients of the composition as well as the types of other ingredients which may optionally be added to the composition are as hereinbefore described in connection with the descriptions of the process.

The following Examples further illustrate the present invention parts and percentages being given by weight.

EXAMPLE 1

98 parts of corn flour, 1 part of sodium alginate sold under the trade name Kelcogel HV and 1 part of propylene glycol alginate sold under the trade name Kelcoloid HVF were premixed until uniform and then mixed with water to a total moisture content of 30–33%, extruded into a spiral pasta shape (3 cm long, 1 cm diameter and 0.15 cm thick) and finally dried at 80–85% relative humidity at 50° C. for 6 hours. The moisture content of the dried pastas was 9–12%.

The pasta was then tested for cooked weight and cooked firmness by the following methods:

The cooked weight was determined by boiling 50 g pasta in 1 liter of water for 12 minutes and weighing the drained pasta (g).

The cooked firmness was determined by boiling 50 g pasta in 1 liter of water for 12 minutes, weighing out 100 g cooked pasta and recording the peak force required to shear the pasta in an Instrom Universal Testing Instrument by using a Kramer Shear Test attachment ($Kg/cm^2$).

Cooked weight is basically the indicator of water absorption but it is also related to the cooling loss and, therefore, its cooling quality. By the combination of cooked weight and cooked firmness, the cooking quality and texture of the pasta can be measured. In addition, organoleptic testing was used to evaluate the texture of the cooked pasta, mainly the elasticity and the stickiness.

The results obtained for the corn pasta were as follows:

| Cooked weight | 157 g |
|---|---|
| Cooked firmness | 23 $kg/cm^2$ |
| Texture | Firm and elastic |

COMPARATIVE EXAMPLES A TO E

A process similar to that described in Example 1 was carried out but using the quantities of ingredients shown in Table I. The cooking qualities and texture of the corn pasta compositions are also shown in Table I.

TABLE I

| Example | A | B | C | D | E |
|---|---|---|---|---|---|
| Corn flour | 100 | 95 | 95 | 99 | 99 |
| Egg White Powder | — | 5 | — | — | — |
| Wheat Gluten (Supergluten 80) | — | — | 5 | — | — |
| Sodium Alginate (Kelcogel HV) | — | — | — | 1 | — |
| Propylene Glycol Alginate (Kelcoloid HVF) | — | — | — | — | 1 |
| Cooked Weight (g) | 115 | 150 | 133 | 138 | 138 |
| Cooked Firmness ($Kg/cm^2$) | 14 | 20 | 16 | 18 | 26 |
| Texture | Pasty | Mealy | Pasty | Pasty | Firm |

As shown in Table I, pasta made from corn flour alone (Example A) had poor cooking qualities. The addition of egg white (Example B) increased the cooked weight and firmness but the texture was mealy and not like that of a typical wheat pasta. Both the addition of wheat gluten and sodium alginate (Examples C and D) increased the cooked weight but the texture was still pasty while the addition of propylene glycol alginate produced a corn pasta with a firm texture but still not quite the same as wheat pastas owing to low water absorption. By using the combination of propylene glycol and sodium alginate as in Example 1 of the invention the water absorption and cooked weight were increased and the texture became more elastic, similar to that of wheat pastas.

EXAMPLE 2

A similar procedure to that described in Example 1 was followed but using 58 parts of pre-cooked potato powder and 40 parts of potato starch instead of the 98 parts of corn flour there used.

The results obtained for the potato pasta were as follows:

| Cooked weight | 144 g |
|---|---|
| Cooked firmness | 30 $kg/cm^2$ |
| Texture | Firm and elastic |

COMPARATIVE EXAMPLES F TO J

A process similar to that described in Example 2 was carried out but using the quantities of ingredients shown in Table II. The cooking qualities and texture of the potato pasta compositions are also shown in Table II.

TABLE II

| Example | F | G | H | I | J |
|---|---|---|---|---|---|
| Pre-Cooked Potato Powder | 60 | 55 | 55 | 59 | 59 |
| Potato Starch | 40 | 40 | 40 | 40 | 40 |
| Egg White Powder | — | 5 | — | — | — |
| Wheat Gluten (Supergluten 80) | — | — | 5 | — | — |
| Sodium Alginate (Kelcogel HV) | — | — | — | 1 | — |
| Propylene Glycol Alginate (Kelcoloid HVF) | — | — | — | — | 1 |
| Cooked Weight (g) | 126 | 122 | 167 | 130 | 136 |
| Cooked Firmness ($Kg/cm^2$) | 17 | 20 | 11 | 15 | 35 |
| Texture | Pasty | Pasty | Pasty | Pasty | Firm |

As shown in Table II, pasta made from a mixture of precooked potato powder and potato starch alone (Example F) had poor cooking qualities. The addition of egg white (Example G) or wheat gluten (Example H) failed to obtain the combination of both good cooked weight and firmness. The addition of sodium alginate (Example I) gave no improvement and although the addition of propylene glycol alginate (Example J) increased the cooked weight and firmness the texture was rather stringy owing to low water absorption. By using the combination of propylene glycol alginate and sodium alginate as in Example 2 the water absorption and cooked weight were increased and the stringiness of the pasta texture was reduced.

EXAMPLE 3

A similar procedure to that described in Example 1 was followed but using 68 parts of pea flour and 30 parts of pea starch instead of the amounts there used.

The results obtained were as follows:

| Cooked weight | 134 g |
|---|---|
| Cooked firmness | 24 $kg/cm^2$ |
| Texture | Firm and elastic |

COMPARATIVE EXAMPLES K TO P

A process similar to that described in Examples 2 or 3 was carried out but using the quantities of ingredients shown in Table III. The cooking qualities of the pea pasta compositions are also shown in Table III.

TABLE III

| Example | K | L | M | N | O | P |
|---|---|---|---|---|---|---|
| Pea Flour | 100 | 95 | 95 | 98 | 80 | 68 |

TABLE III-continued

| Example | K | L | M | N | O | P |
|---|---|---|---|---|---|---|
| Pea Starch | — | — | — | — | 20 | 27 |
| Egg White Powder | — | 5 | — | — | — | 5 |
| Wheat Gluten (Supergluten 80) | — | — | 5 | — | — | — |
| Sodium Alginate (Kelcogel NV) | — | — | — | 1 | — | — |
| Propylene Glycol Alginate (Kelcoloid HVF) | — | — | — | 1 | — | — |
| Cooked Weight (g) | 125 | 141 | 114 | 145 | 63 | 128 |
| Cooked Firmness (Kg/cm²) | 16 | 22 | 10 | 18 | 9 | 13 |
| Texture | Pasty | Mealy | Pasty | Mealy | Pasty | Pasty |

As shown in Table III, pasta made from pea flour alone (Example K) had poor cooking qualities and the addition of egg white, wheat gluten and alginate gums (Examples L, M and N) did not provide the elastic firm texture as was obtained in Example 3 by the addition of pea starch and the mixture of alginate gums. The use of starch alone (Example O) or combination of starch and egg white powder (Example P) did not provide the elastic firm texture either.

EXAMPLE 4

A similar procedure to that described in Example 1 was followed but using 68 parts of kidney bean flour and 30 parts of corn starch instead of the 98 parts of corn flour there used.

The results obtained for the bean pasta were as follows:

| | |
|---|---|
| Cooked weight | 137 g |
| Cooked firmness | 22 kg/cm² |
| Texture | Firm and elastic |

COMPARATIVE EXAMPLES Q TO V

A process similar to that described in Example 4 was carried out but using the quantities of ingredients shown in Table IV. The cooking qualities of the bean pasta composition are also shown in Table IV.

TABLE IV

| Example | Q | R | S | T | U | V |
|---|---|---|---|---|---|---|
| Kidney Bean Flour | 100 | 95 | 95 | 98 | 70 | 65 |
| Corn Starch | — | — | — | — | 30 | 30 |
| Egg White Powder | — | 5 | — | — | — | 5 |
| Wheat Gluten (Supergluten 80) | — | — | 5 | — | — | — |
| Sodium Alginate (Kelcogel HV) | — | — | — | — | — | — |
| Propylene Glycol Alginate (Kelcoloid HVF) | — | — | — | 1 | — | — |
| Cooked Weight (g) | 139 | 155 | 134 | 139 | 107 | 150 |
| Cooked Firmness (Kg/cm²) | 13 | 21 | 13 | 15 | 12 | 20 |
| Texture | Pasty | Mealy | Pasty | Pasty | Pasty | Mealy |

As shown in Table IV, pasta made from bean flour alone (Example Q) had poor cooking qualities and the addition of egg white, wheat gluten and alginate gums (Examples R, S and T) did not provide the elastic firm texture similar to wheat pasta as obtained in Example 4. The use of starch alone (Example U) or a combination of starch and egg white powder (Example V) did not provide the elastic firm texture either.

I claim:

1. A process for the preparation of a vegetable pasta which comprises mixing a composition comprising a seed or tuberous vegetable in particulate form and, based on the total weight of the composition, from 0.1 to 4% by weight of sodium or potassium alginate or a mixture thereof, from 0.1 to 4% by weight of propylene glycol alginate and from 0 to 75% by weight of starch, said composition containing substantially no wheat flours, with an amount of water sufficient to moisten the composition and render it extrudable, extruding said mixture into a pasta shape, and finally drying the extruded mixture, with the proviso that at least 10% by weight of starch must be present when a high protein vegetable or potato powder is used.

2. A process according to claim 1, wherein the amount of sodium or potassium alginate or a mixture thereof is from 0.5 to 2.5% by weight based on the total weight of the composition.

3. A process according to claim 1, wherein the amount of propylene glycol alginate is from 0.5 to 2.5% by weight based on the total weight of the composition.

4. A process according to claim 1, wherein the amount of starch present when a high protein vegetable or potato powder is used is from 20 to 60% by weight based on the total weight of the composition.

5. A process according to claim 1, wherein the vegetable is potato, sweet potato, corn, pea, lentil or bean.

6. A pasta composition comprising a seed or tuberous vegetable in particulate form and, based on the total weight of the composition, from 0.1 to 4% by weight of sodium or potassium alginate or a mixture thereof, from 0.1 to 4% by weight of propylene glycol alginate and from 0 to 75% by weight of starch, said composition containing substantially no wheat flours.

* * * * *

UNITED STATES PATENT AND TRADEMARK OFFICE
CERTIFICATE OF CORRECTION

PATENT NO. : 4,517,215
DATED : May 14, 1985
INVENTOR(S) : Jau Y. Hsu

It is certified that error appears in the above—identified patent and that said Letters Patent is hereby corrected as shown below:

Column 3, line 13, "cooling" should read --cooking--.

Column 3, line 14, "cooling" should read --cooking--.

Signed and Sealed this

Third Day of September 1985

[SEAL]

*Attest:*

DONALD J. QUIGG

*Attesting Officer*  *Acting Commissioner of Patents and Trademarks - Designate*